Jan. 16, 1962  J. E. DE VILLIERS  3,016,751
AUTOMATIC BALANCING MACHINES
Filed Sept. 16, 1959  2 Sheets-Sheet 1
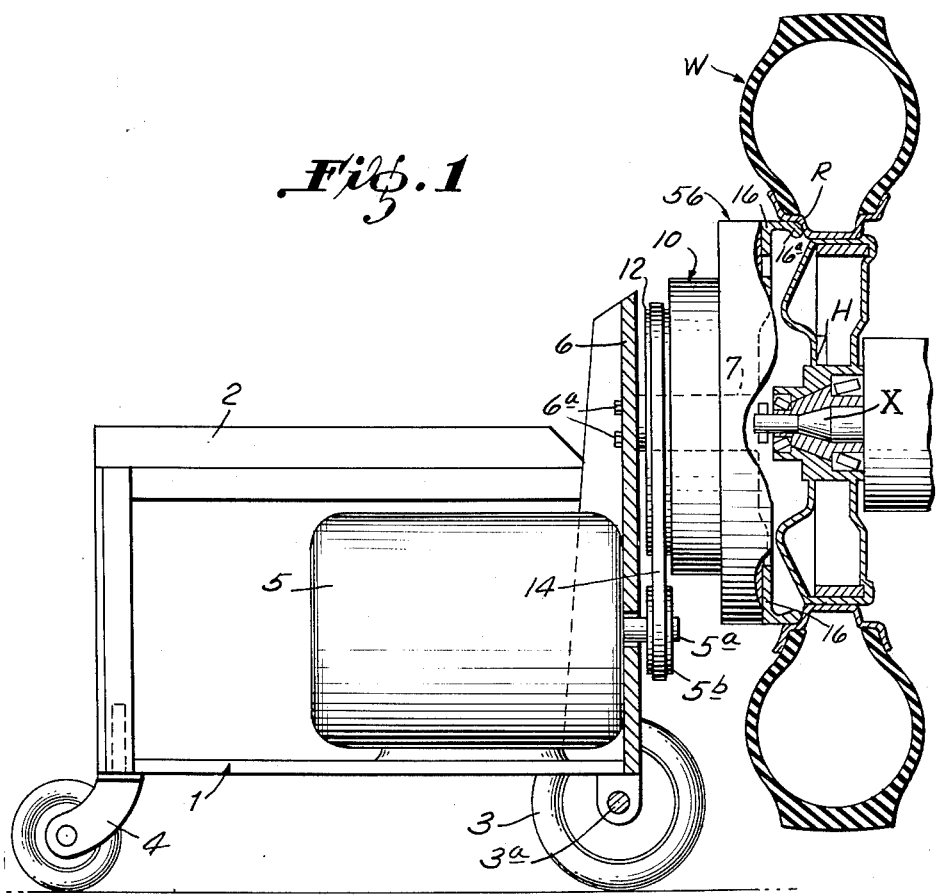
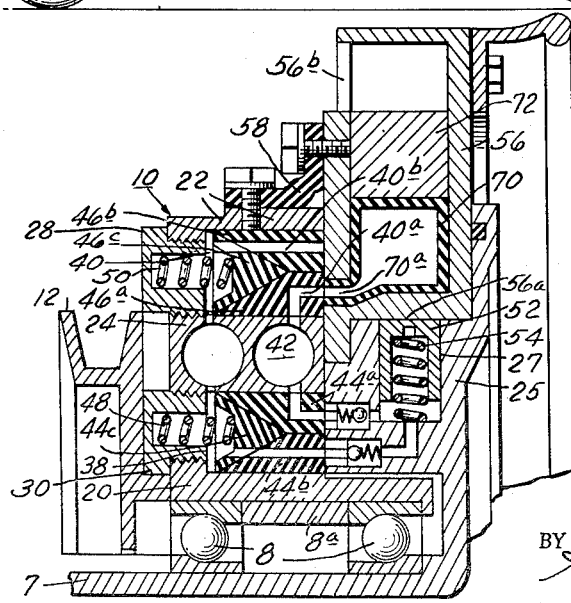
INVENTOR
Joseph E. deVilliers
BY Alexander & Dowell
ATTORNEYS

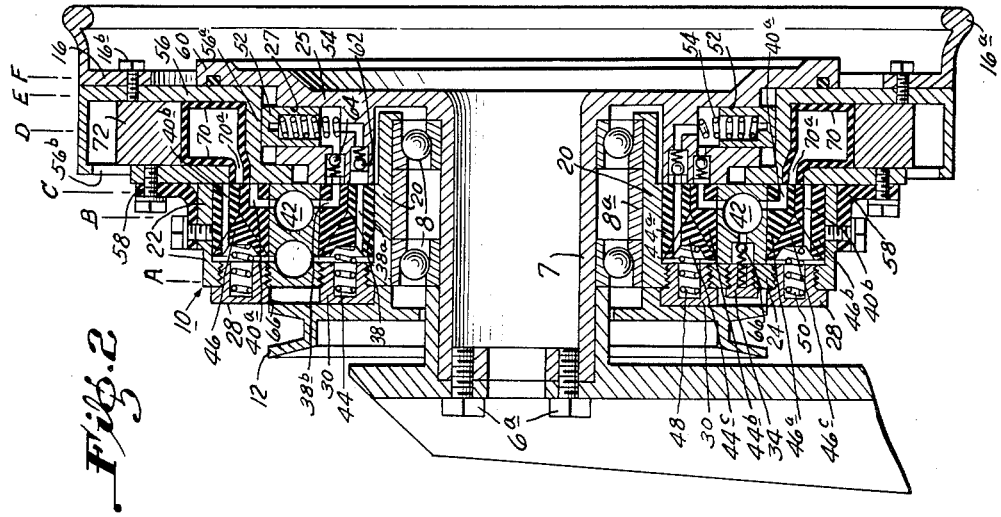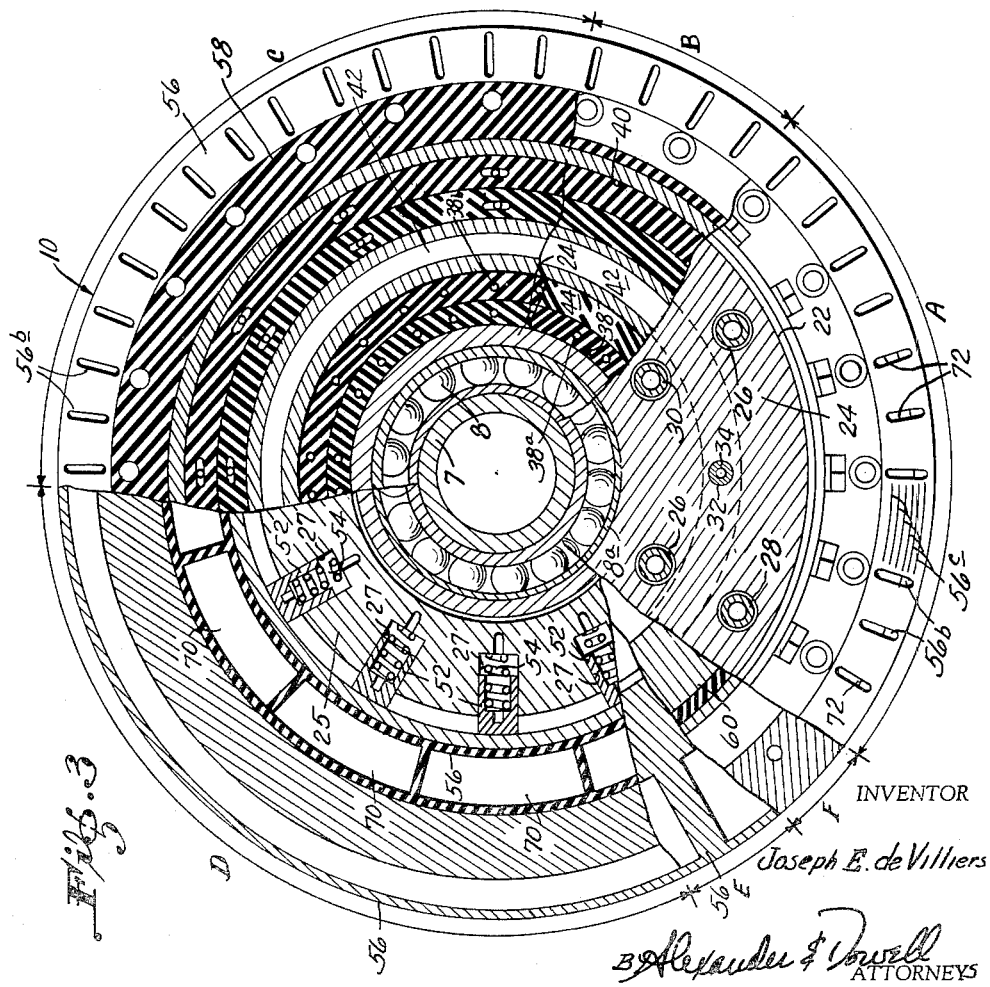

& nbsp;

3,016,751
AUTOMATIC BALANCING MACHINES
Joseph E. De Villiers, 420 Le Boeuf St.,
New Orleans 14, La.
Filed Sept. 16, 1959, Ser. No. 840,459
18 Claims. (Cl. 73—468)

This invention relates to balancing equipment, and more particularly to a machine having a balancing drum which is coupled with a wheel or other device to be balanced and rotated therewith, the machine during rotation with the wheel automatically redistributing a balancing liquid within the drum so as to balance the composite wheel and drum, and the machine then furnishing an indication of the angular position and amount of weight added and/or subtracted in order to achieve a balance. The operator of the machine is thus informed of the position and amount of unbalance of the wheel so that he can alter the weight distribution thereof to correct the existing unbalance of the wheel itself.

It is a principal object of the invention to provide a self-powered balancing machine having a rotary balancing drum, the rotation of which actuates internal pumping means which automatically distribute a balancing liquid from a reservoir into resilient ballast tubes circumferentially spaced around the drum, the pumped liquid, preferably oil, being correctly distributed among the ballast tube sections by automatically operating valves, and the pumping automatically ceasing when precise balance of the combined drum and wheel is achieved.

It is another object of the invention to provide a balancing machine wherein no resetting of the mechanism is necessary from one balancing operation to the next, the distribution of the liquid being automatically obtained during each balancing operation.

Although the present invention is illustrated and described with reference to the balancing of a vehicle wheel carried on an axle, it is to be clearly understood that the balancing machine is not limited to this specific use, but that other applications thereof are contemplated wherein the basic machine in slightly modified form can be used to balance other rotary bodies.

Other objects and advantages of the present invention will become apparent during the following discussion of the drawings, wherein:

FIG. 1 is a side elevation showing the balancing machine coupled with a vehicle wheel mounted on an axle, a portion of the balancing machine, the wheel and the tire being shown in cross section;

FIG. 2 is an enlarged cross section taken through the balancing machine and a portion of the bracket on which it is supported;

FIG. 3 is a composite of six sectional views taken along lines A—A, B—B, C—C, D—D, E—E, and F—F, these lines being shown in FIG. 2;

FIG. 4 is an enlarged section view corresponding with the upper half of the balancing machine cross sectional view of FIG. 2, the cross section of FIG. 4 showing the various internal parts of the balancing drum in a different relative working position.

Referring now to the drawings, FIG. 1 illustrates a frame 1 having a flat upper surface 2 on which the operator of the device sits during balancing of the wheel so as to add his weight to the weight of the machine and thereby increase the stability thereof. The frame is supported on a pair of wheels 3 journaled on an axle 3a at one end, and a pair of casters 4 supporting the other end of the frame 1. Within the frame is a prime mover such as an electric motor 5 having a shaft 5a carrying a pulley 5b. The shaft 5a extends through an opening in the upright bracket 6 which supports a spindle 7 on which the balancing drum is journaled by ball bearings 8, see FIGS. 2 and 4. The spindle 7 is secured to the bracket 6 by means of bolts 6a so that the spindle remains stationary and supports the inner race of the ball bearing means 8.

The rotating member of the balancing machine comprises a drum-shaped body 10 having an inner periphery supporting an outer ball race 8a which forms a part of the ball bearing means 8 about which the drum 10 is rotatably mounted. At the left end of the drum 10 there is mounted a pulley 12 disposed in alignment with the pulley 5b on the motor shaft, and a V-belt 14 passes over both pulleys and transmits drive from the motor 5 to the drum 10. The drum carries on its outer face an adapter 16 having an outwardly extending flange 16a which engages the inner rim R of the wheel W to be balanced, the wheel W being understood as including also the vehicle tire. The wheel has a hub H which supports the outer race of a roller bearing and mounts the wheel on the axle X in a conventional manner.

In order to engage the balancing machine with the wheel, the vehicle axle is jacked up off of the pavement and the balancing machine is rolled up to the wheel so that the flange 16a of the adapter 16 frictionally engages the rim R of the wheel.

Referring to FIGS. 2, 3 and 4, it will be seen that the drum body 10 includes an inner peripheral portion 20 supported on the outer races of the ball bearing means 8, separated by a spacer 8a. The drum comprises a system of hollow ducts within the body between an inner peripheral body portion 20 and an outer peripheral portion 22.

Referring to FIG. 3, cross section A, it will be seen that the drum also includes a central portion 24 having a plurality of tapped holes 26 therethrough which holes receive an outer series of screw plugs 28 and an inner series of screw plugs 30 serving the purpose hereinafter stated. In addition, there are intermediate smaller holes 32 which receive small screw plugs 34, which will also be further explained hereinafter.

On the other side of the wall portion 24 having the above mentioned tapped holes and screw plugs are located inner and outer oil ducts 38 and 40 respectively, as shown in FIG. 3 at cross section B. There is also a central duct 42 located therebetween.

The ducts 38 and 40 receive seals each of which is formed in three annular parts. The inner seal 44 comprises parts 44a, 44b and a triangular wedge-shaped part 44c.

Likewise, the outer seal 46 comprises three parts, namely 46a, 46b and a wedge-shaped part 46c.

The inner wedge-shaped part 44c is compressed inwardly against the parts 44a and 44b of the seal 44 by a plurality of annularly spaced springs 48 each of which is compressed by one of the screw plugs 30. Likewise the outer annular wedge-shaped part 46c of the seal 46 is compressed against the other two parts 46a and 46b by an annular series of compression springs 50 each of which is pressed inwardly by one of the outer screw plugs 28. The central portion 24 of the drum also includes a pump portion 25 having a series of radially extending cylinder bores 27 which can be best seen in FIGS. 2, 3 and 4, and particularly at section D of FIG. 3. Each of the cylinder bores 27 has a piston 52 located therein and each piston 52 is pushed outwardly by a compression spring 54 located between the piston and the inner end of the cylinder bore 27. The outer end of each piston 52 bears against the inner periphery 56a of a balancing body 56, the balancing body being of annular construction and fitting against the face of the drum 10. Each of the pistons 52 is thus displaced within its associated cylinder bore whenever the center of the balancing body 56 becomes eccentric with respect to the center of the drum 10 and the spindle 7, the balancing body 56 being free to move inwardly and outwardly so as to move its center off of the center of the spindle 7. The balancing body 56 is coupled to the drum 10 by an annular resilient coupling member 58 which is sufficiently flexible that the balancing body 56 may move radially with respect to the drum 10.

In FIG. 2, the drum 10 is always centered with respect to the spindle 7, but in FIG. 4 the upper part of the balancing body 56 is moved downwardly as far as it will go and thus the center of the balancing body 56 is moved vertically below the center of the spindle 7 in the position of the device shown in FIG. 4.

The balancing body 56 supports an adapter 16 by means of bolts 16b as shown in FIG. 2. The balancing body 56 is retained against the face of the drum 10 by a flange member 60 so that the only motion which the balancing body 56 can have with respect to the drum 10 is in the radial direction.

The ducts 38, 40 are filled with oil, or other liquid having lubricating properties, and these ducts comprise a reservoir and are connected by other ducts to the pump cylinders 27 and the pump pistons 52. When one of the pistons 52 moves outwardly, it draws oil from the inner duct 38 through the passages 38a in the seal 44 and through a check valve 62 in the portion 25 of the drum. The oil then enters the cylinder bore 27, and if subsequently the balancing body 56 moves inwardly and presses the associated piston 52 toward the bottom of the cylinder bore 27, the oil is then pumped outwardly through another check valve 64 and through the passage 38b and into the manifold 42 so as to pressurize the oil in the latter. Thus, any radial motion of the balancing body 56 with respect to the drum 10 moves at least some of the pistons 52 inwardly in the bores 27 and thereby pressurizes the oil in the manifold 42. Whenever the manifold 42 is pressurized, all of the ducts 40a are likewise pressurized around the entire circumference of the seal 46.

A series of pressure relief valves 66 are loaded by springs contained within the screw plugs 34, and serve to limit the pressure which can be built up within the manifold 42 by motion of the balancing body 56. Oil which escapes through any of the relief valves 66 is returned to the ducts 38 and 40. The ducts 38 and 40 are in communication with each other and are also connected with each of the ducts 40b so that the oil contained in the ducts 40b is directly connected to the unpressurized reservoir formed by the ducts 38 and 40.

*Operation*

When it is desired to balance a rotating body, such as the vehicle wheel W, an adapter 16 is engaged with the rim R, and the motor 5 is energized so as to rotate the drum by way of the pulleys 5b and 12 of the belt 14. Rotation of the drum 10 also causes rotation of the balancing body 56 and thereby rotation of the adapter 16 which in turn rotates the wheel W.

Assuming that the wheel W is out of balance, there will be a tendency for the wheel to rotate eccentrically, and the eccentric motion thereof will cause the adapter 16 and the balancing body 56 to follow the eccentric motion and thus there will be relative radial motion between the balancing body 56 and the drum 10 which includes body portions 25, 22 and 20, all of which form parts of the drum 10. The resilient coupling 58 permits this relative radial motion, and the radial motion causes the resilient ballast tubes 70 to be moved radially inwardly and outwardly so that the duct 72a leading into each section of the tube 70, which is divided as shown in FIG. 3, at cross section D, will be moved inwardly and outwardly with respect to the ports 40a and 40b. If the duct 70a during this motion communicates with the inner port 40a as shown in the position of the device illustrated in FIG. 4, oil pressure from the pressurized manifold 42 will force oil into that particular section of the tube 70 and thereby cause inflation of the tube which in turn will cause the annular ring 72 which passes around all of the tube sections to be moved outwardly within the balancing body 56 at the annular location of the section of the tube 70 which is then being inflated. Outward motion of that portion of the ring will thereby increase the weight at that angular position of the drum, while at the same time the diametrically opposite portion of the ring 72 will be drawn radially inwardly so as to decrease the weight on the other side, thereby effecting a shift of balance. Conversely, if the balancing body 56 should move outwardly during rotation of the machine the ducts 70a would line up with the outer port 40b and some of the oil in that particular section of the tube 70 would then be returned through the port 40b into the reservoir 40 so as to partially deflate the associated section of the tube 70 and thereby permit the ring 72 to move radially inwardly.

It is important to note that outward motion of the balancing body 56 at one angular location is always accompanied by inward motion of the balancing body 56 at the diametrically opposite angular location. Therefore, whenever oil is being pumped into one section of the tube, a like amount thereof will be withdrawn from the opposite section of the tube so that the net amount of oil in the reservoirs 38 and 40 as well as in the manifold 42 remains substantially constant, although the oil is distributed differently among various sections of the tube 70.

At least one face of the balancing body 56 is provided with an annular series of radial slots 56b as can be seen in FIG. 3 at sections A, B and C. These slots 56b permit the observation of the position of the ring 72, and the face of the balancing body 56 adjacent the slots can be provided with a plurality of indicia 56c by which the position of the ring 72 may be calibrated in terms of the amount of weight by which the wheel W is out of balance. In other words, the ring 72 can be seen through the slots 56b and thereby used to gauge the position of the ring 72 after the oil has been properly distributed among all of the sections of the tube 70 so as to effect a balance.

I do not limit my invention to the exact form shown in the drawings, for obviously changes may be made therein within the scope of the following claims.

I claim:

1. A machine to be connected with and to rotate a wheel to be balanced for automatically balancing out eccentricities in the weight thereof, comprising a frame; a motor mounted in the frame; a drum journaled on the frame and connected with the motor for rotation thereby; an annular balancing body carried by the drum and coupled for rotation therewith, the body being radially displaceable with respect to the axis of the drum; wheel coupling means for tightly connecting the balancing body with the wheel in coaxial relation therewith, said balancing body having a plurality of liquid receiving tube sections arranged in an annular series therewithin and said drum having a liquid containing reservoir and a liquid manifold; pump means connected between the drum and the balancing body whereby eccentric radial motion therebetween actuates the pump means to transfer liquid from the reservoir into the manifold; and valve means connected with each tube section and selectively connecting the latter to the reservoir or the manifold depending on the direction of radial displacement of the body on the drum to alter the distribution of liquid among the tube sections to reduce the unbalance causing the eccentric motion.

2. In a machine as set forth in claim 1, said drum having an annular recess in its outer periphery, and said balancing body being annular and confined in said recess but radially movable therein.

3. In a machine as set forth in claim 2, said tube sections comprising a rubber-like tube divided into separate sections and each section having a separate communication duct passing through a wall of the balancing body; and valve means including in the drum adjacent each communication duct an inner liquid port connected with the manifold and an outer liquid port connected with the reservoir whereby inward radial motion of the balancing body at a particular tube section connects the duct connected with the latter to be inflated from the manfold, and outward radial motion connects the duct to the reservoir to be deflated into the latter, the two ports being spaced by at least the diameter of the duct.

4. In a machine as set forth in claim 3, the drum having annular seal means in said recess opposite the said wall of the balancing body, the ducts each being a hole through said wall; and the inner and outer ports each being a hole through said seal means circumferentially aligned with an associated duct; and spring means in the drum pressing the seal against the said wall.

5. In a machine as set forth in claim 4, said pump means comprising an annular series of pistons in radially disposed cylinder bores in the drum, the pistons underlying the balancing body in the recess and being reciprocated by radially eccentric motions of the body with respect to the drum, the latter having liquid passages connecting the cylinder bores with the reservoir and the manifold; and pump valve means in the passages.

6. In a machine as set forth in claim 5, an annular resilient coupling means around the drum and the balancing body and secured to each, the coupling means transferring rotary drive forces between the drum and the body.

7. In a machine as set forth in claim 6, an annular ring within the body and overlying the outer peripheries of said tube sections, and said body having radial slots in at least one of its radial walls whereby the radial positions of various peripheral portions of the ring can be viewed to determine the circumferential locations at which weight was added and subtracted by inflation and deflation of the tube sections.

8. In a machine as set forth in claim 7, indicia inscribed on the last mentioned radial wall adjacent the slots and calibrated in terms of units of weight added thereat by the machine to effect balance.

9. In a machine as set forth in claim 1, said wheel coupling means comprising an annular flange connected to said body and snugly engaging the rim of the wheel.

10. A machine to be connected to and rotated with a wheel to be balanced for automatically balancing out eccentricities in the weight thereof, comprising a frame; a drum journaled on the frame; an annular balancing body carried by the drum and connected to rotate with the latter, the body being radially displaceable with respect to the axis of the drum; wheel coupling means for tightly connecting the balancing body with the wheel in coaxial relation therewith, said balancing body having a plurality of liquid receiving tube sections arranged in an annular series therewithin and said drum having a liquid containing reservoir and a liquid manifold; pump means connected between the drum and the balancing body whereby eccentric radial motion therebetween actuates the pump means to transfer liquid from the reservoir into the manifold; and valve means connected with each tube section and selectively connecting the latter to the reservoir or the manifold depending on the direction of radial displacement of the body on the drum to alter the distribution of the liquid among the tube sections to reduce the unbalance causing the eccentric motion.

11. In a machine as set forth in claim 10, said drum having an annular recess in its outer periphery, and said balancing body being mounted in said recess and radially movable therein.

12. In a machine as set forth in claim 11, said tube sections comprising a rubber-like tube divided into separate sections and each section having a separate communication duct passing through a wall of the balancing body; and valve means including in the drum adjacent each communication duct an inner liquid port connected with the manifold and an outer liquid port connected with the reservoir whereby inward radial motion of the balancing body at a particular tube section connects the duct connected with the latter to be inflated from the manifold, and outward radial motion connects the duct to the reservoir to be deflated into the latter, the two ports being spaced by at least the diameter of the duct.

13. In a machine as set forth in claim 12, the drum having annular seal means in said recess opposite the said wall of the balancing body, the ducts each being a hole through said wall; and the inner and outer ports each being a hole through said seal means circumferentially aligned with an associated duct; and spring means in the drum pressing the seal against the said wall.

14. In a machine as set forth in claim 13, said pump means comprising an annular series of pistons in radially disposed cylinder bores in the drum, the pistons underlying the balancing body in the recess and being reciprocated by radially eccentric motions of the body with respect to the drum, the latter having liquid passages connecting the cylinder bores with the reservoir and the manifold; and pump valve means in the passages.

15. In a machine as set forth in claim 14, an annular resilient coupling means around the drum and the balancing body and secured to each, the coupling means transferring rotary drive forces between the drum and the body.

16. In a machine as set forth in claim 15, an annular ring within the body and overlying the outer peripheries of said tube sections, and said body having radial slots in at least one of its radial walls whereby the radial positions of various peripheral portions of the ring can be viewed to determine the circumferential locations at which weight was added and subtracted by inflation and deflation of the tube sections.

17. In a machine as set forth in claim 16, indicia inscribed on the last mentioned radial wall adjacent the slots and calibrated in terms of units of weight added thereat by the machine to effect balance.

18. A machine to be connected to and rotated with a wheel to be balanced for automatically balancing out eccentricities in the weight thereof, comprising a frame; a drum journaled on the frame; an annular balancing body coupled by radially displaceable means to the drum for rotation therewith; wheel coupling means for coupling the balancing body with the wheel in coaxial relation therewith, said balancing body having a plurality of radially expansible cavity means arranged in an annular series therearound and said drum having a liquid containing reservoir and a liquid manifold; pump means connected between the drum and the balancing body whereby eccentric radial motion therebetween actuates the pump means to transfer liquid from the reservoir into the manifold; and valve means connected with each expansible cavity means and selectively connecting the latter to the reservoir or the manifold depending on the direction of radial displacement of the body on the drum to alter the distribution of the liquid among said cavity means to reduce the unbalance causing the eccentric motion.

References Cited in the file of this patent

UNITED STATES PATENTS

| | | |
|---|---|---|
| 1,243,345 | Rodgers | Oct. 16, 1917 |
| 1,554,014 | MacFarland | Sept. 15, 1925 |

FOREIGN PATENTS

| | | |
|---|---|---|
| 722,861 | Great Britain | Feb. 2, 1955 |